United States Patent Office

2,798,868
Patented July 9, 1957

2,798,868

PRODUCTION OF COPOLYMERS OF IMPROVED HOMOGENEITY

Alfred L. Miller, Roselle, N. J., assignor to Celanese Corporation of America, New York, N. Y., a corporation of Delaware No Drawing. Application October 29, 1952,
Serial No. 317,565

8 Claims. (Cl. 260—85.5)

This invention relates to polymers and relates more particularly to a novel process for the production of copolymers of improved homogeneity.

The homogeneity of a copolymer produced by polymerizing together two or more monomers depends, among other things, on the relative speed with which the monomers enter into the polymer. If one of the monomers tends to polymerize at a faster rate than the other under the conditions employed, the copolymer produced during the early stages of the polymerization will contain a higher percentage of the said monomer than is present in the polymerization mix. As the polymerization proceeds, the percentage of the more rapidly polymerizing monomer remaining in the polymerization mix will drop, owing to the fact that it is being used up more rapidly during the polymerization, and the composition of the polymer produced from said mix will change. The lack of homogeneity of the copolymer tends to lower the melting point thereof which is objectionable, particularly in those cases where it is desired to produce textile materials from said copolymers since such textile materials should have a high melting point to permit safe ironing. The lack of homogeneity may also affect other properties of said copolymers, such as solubility, strength, elongation and the like, in an unfavorable manner.

It is an important object of this invention to provide a novel process for the production of copolymers by the polymerization of two or more monomers which will be free from the foregoing and other difficulties.

A further object of this invention is to provide a novel process for the production of copolymers by the polymerization of two or more monomers which will yield products of improved homogeneity.

Other objects of this invention will be apparent from the following detailed description and claims.

According to the present invention a copolymer of improved homogeneity is prepared by polymerizing together two or more monomers in a solvent whose solution capacity is such that it will not dissolve all of at least one of the monomers, preferably the more rapidly reacting monomer, so that when the polymerization begins there is present in the polymerization mix some of this monomer in an undissolved state. Then, as the polymerization proceeds, the undissolved portion of the monomer goes into solution gradually as the dissolved portion of said monomer is consumed, maintaining the concentration of said monomer unchanged during a large portion of the polymerization. This method is particularly useful where the incompletely dissolved monomer is a solid at the temperature of the polymerization, especially since prior methods for improving the homogeneity of a copolymer such as effecting the polymerization at reflux are inapplicable or very difficult to apply to such solid monomers. Carrying out the polymerization at reflux also tends generally to produce a polymer having an undesirably low molecular weight because of the elevated temperatures involved, which elevated temperatures need not be employed in the process of the present invention. Particularly valuable results in improving the homogeneity of a copolymer are obtained when the total quantity of the less soluble monomer constitutes at least about 5 mole percent or preferably about 10 mole percent of the total monomers. It may be desirable, in carrying out the polymerization, to add measured quantities of the fully dissolved monomers to the polymerization mix toward the end of the polymerization further to improve the homogeneity of the polymer.

In carrying out the polymerization, a single solvent may be employed which has a solution capacity such that it will leave undissolved the correct proportion of one of the monomers and be otherwise suitable as a polymerization medium. Generally, however, no or very few single solvents will have the correct combination of properties to function by themselves as a polymerization medium. Suitable solvents for carrying out the polymerization may, however, be readily prepared by mixing together a plurality of miscible liquids some of which are good solvents for the monomer which is to be incompletely dissolved and others of which are poor solvents for the monomer which is to be incompletely dissolved. By adjusting the relative proportions of such liquids it is possible to bring the solution capacity of the polymerization medium to precisely the desired value. For example, if the monomer which is to be incompletely dissolved exhibits a good solubility in alcohol and a poor solubility in water, a mixture of alcohol and water in the proper portions will have the proper solution capacity for the said monomer.

The polymerization may be effected in conventional manner in the presence of suitable polymerization catalysts, accelerators, initiators, redox systems, chain transfer agents and the like, all as well known in the art of producing copolymers.

A particularly valuable class of copolymers that may be prepared in accordance with the process of this invention are the copolymers of a vinamide or alpha-beta unsaturated acid amide, which is a solid, and acrylonitrile. Examples of suitable vinamides are N-methyl acrylamide, N-ethyl acrylamide, N-propyl acrylamide, N-butyl acrylamide, N-octyl acrylamide and the like, N-phenyl acrylamide and the corresponding methacrylamides. Especially useful polymers are obtained when the nitrogen atom of the vinamide carries a substituent linked thereto by a tertiary carbon atom or a secondary carbon atom which is a part of a cycloalkyl group. Examples of vinamide falling within this class are N-tertiary butyl acrylacide, N-tertiary amyl acrylamide, N-(dimethyl-phenylcarbinyl)-acrylamide, N-cyclohexyl acrylamide, N-cyclopentyl acrylamide and the corresponding methacrylamides, N-tertiary butyl crotonamide, N-tertiary butyl cinnamamide, N-tertiary amyl crotonamide, N-cyclohexyl cinnamamide, N-cyclopentyl crotonamide and N-cyclopentyl cinnamamide.

The percentage of acrylonitrile in the polymer will vary depending upon the properties it is desired to obtain in the final product. Generally, good results are obtained when the monomer mixture contains at least about 1 mole percent of acrylonitrile, or, preferably, between about 5 and 95 mole percent of acrylonitrile. The polymerization may be carried out at temperatures of between about 20 and 80° C., or, in some cases, even at temperatures below 0° C., and will usually be completed in between about 1 and 6 hours. Careful control of the temperature is desirable since changes in temperature will alter the solution capacity of the solvent employed. When the solvent employed to carry out the polymerization comprises a mixture of alcohol and water there is some tendency for the alcohol to act as a chain transfer agent interrupting the growth of the polymer chains. The low concentration of alcohol keeps this effect to a minimum and permits the production of polymers of high intrinsic viscosity. In addition, it has been found that by employing secondary or preferably tertiary alcohols this chain transfer effect may be reduced even further to permit the production of polymers of extremely high intrinsic viscosity.

The vinamides may also be copolymerized with other polymerizable materials such as, for example, methyl acrylate, methyl methacrylate, styrene, and vinyl acetate. Other copolymers that may be prepared in accordance with the process of this invention are, for example, the copolymers of acrylic acid and styrene, acrylamide and styrene, dimethyl fumarate and acrylonitrile, and dimethyl itaconate and acrylonitrile.

The following examples are given to illustrate this invention further.

Example I

There is added to aqueous methanol, containing 15 percent by volume of methanol, 50 grams per liter of monomers comprising 35 percent by weight of acrylonitrile and 65 percent by weight of N-tertiary butyl acrylamide, 0.27 percent by weight based on the weight of the monomers of potassium persulfate and 0.13 percent by weight based on the weight of the monomers of sodium metabisulfite. The solid N-tertiary butyl acrylamide does not dissolve completely in the aqueous methanol. Polymerization is continued with stirring at a temperature of 36° C. for 1.75 hours during which time all the N-tertiary butyl acrylamide goes into solution. There is obtained a yield of copolymer of good homogeneity corresponding to 92 percent of theoretical and having an intrinsic viscosity of 1.57 when measured as 0.1 percent by weight solution in dimethyl formamide.

Example II

There is added to aqueous methanol, containing 15 percent by volume of methanol, 50 grams per liter of monomers comprising 35 percent by weight of acrylonitrile and 65 percent by weight of N-tertiary butyl-acrylamide. At a temperature of 36° C., not all of the latter monomer is dissolved, and 0.27 percent by weight of potassium persulfate and 0.13 percent by weight of sodium metabisulfite, each based on the weight of total monomer, are added. Polymerization is continued with stirring at a temperature of 36° C. for 1.75 hours, during which time all of the undissolved N-tertiary butyl-acrylamide has dissolved. There is obtained a yield of copolymer of good homogeneity corresponding to 92 percent of theoretical, having an acrylonitrile composition in the polymer of 34.4 percent by nitrogen analysis and having an intrinsic viscosity of 1.57 as a 0.1 percent by weight solution in dimethyl formamide.

Example III

There is added to aqueous methanol, containing 20 percent by volume of methanol, 50 grams per liter of monomers comprising 35 percent by weight of acrylonitrile and 65 percent by weight of N-tertiary butyl-acrylamide. At a temperature of 34° C., not all of the latter monomer is dissolved, and 0.27 percent by weight of potassium persulfate and 0.13 percent by weight of sodium meta-bisulfite, each based on the weight of total monomer, are added. A sample is removed under nitrogen pressure 3 minutes after the beginning of the polymerization and the conversion then is 10 percent, the intrinsic viscosity 2.15, and the acrylonitrile composition 38.7 percent (percent $N=16.95$). A second sample taken 5 minutes after the beginning of the polymerization showed a conversion of 25 percent, an intrinsic viscosity of 2.38, and an acrylonitrile composition of 38.3 percent (percent $N=16.90$). A third sample taken 8 minutes after the beginning of polymerization showed a conversion of 35 percent, an intrinsic viscosity of 2.39 and an acrylonitrile composition of 36.3 percent (percent $N=16.6$). At the end of polymerization, 4.5 hours, the residual polymer showed 100 percent conversion with an intrinsic viscosity of 1.65 and an acrylonitrile composition of 31.1 percent (percent $N=15.7$). All intrinsic viscosities are taken as a 0.1 percent by weight solution in dimethyl formamide.

It is to be understood that the foregoing detailed description is given merely by way of illustration and that many variations may be made therein without departing from the spirit of my invention.

Having described my invention what I desire to secure by Letters Patent is:

1. A process for the production of copolymers of improved homogeneity, which comprises polymerizing together in solution two mono-ethylenically unsaturated monomers capable of copolymerizing, one of which is a solid at the temperature of polymerization and is more rapidly reacting in the polymerization than the other, in a solvent that does not polymerize to enter into the polymer chain, the proportion of monomers and solvent employed being such that the solvent will not dissolve all of the more rapidly reacting monomer present but will dissolve all of the other monomer so that when the polymerization begins some of the more rapidly reacting monomer is present in the polymerization mix in undissolved form.

2. A process for the production of copolymers of improved homogeneity, which comprises polymerizing together in solution two mono-ethylenically unsaturated monomers capable of copolymerizing, one of which is a solid at the temperature of polymerization and is more rapidly reacting in the polymerization than the other, in a solvent that does not polymerize to enter into the polymer chain, the proportions of monomers and solvent employed being such that the solvent will not dissolve all of the more rapidly reacting monomer present but will dissolve all of the other monomer so that when the polymerization begins some of the more rapidly reacting monomer is present in the polymerization mix in undissolved form, said solvent comprising a mixture of at least two liquids one of which is a good solvent for the undissolved monomer and the other of which is a poor solvent for the undissolved monomer.

3. A process for the production of copolymers of improved homogeneity, which comprises polymerizing together in solution an $\alpha$-$\beta$ mono-ethylenically unsaturated acid amide and one other mono-ethylenically unsaturated material polymerizable therewith, said amide being a solid at the temperature of polymerization and being more rapidly reacting in the polymerization than the other unsaturated material, in a solvent that does not polymerize to enter into the polymer chain, the proportions of unsaturated materials and solvent being such that the solvent will not dissolve all of the amide but will dissolve all of the other unsaturated material so that when the polymerization begins some of the amide is present in the polymerization mix in undissolved form.

4. A process for the production of copolymers of improved homogeneity which comprises polymerizing together in solution an $\alpha$-$\beta$ ethylenically unsaturated acid amide and one other mono-ethylenically unsaturated material polymerizable therewith, said amide being a solid at the temperature of polymerization and being more rapidly reacting in the polymerization than the other unsaturated material, in a solvent that does not polymerize to enter into the polymer chain, the proportions of unsaturated materials being such that the solvent will not dissolve all of the amide but will dissolve all of the other unsaturated material so that when the polymerization begins some of the amide is present in the polymerization mix in undissolved form, said solvent comprising a mixture of at least two liquids one of which is a good solvent for the said amide and the other of which is a poor solvent for the said amide.

5. A process for the production of copolymers of improved homogeneity which comprises polymerizing together in solution an $\alpha$-$\beta$ ethylenically unsaturated acid amide and one other mono-ethylenically unsaturated material polymerizable therewith, said amide being a solid at the temperature of polymerization and being more rapidly reacting in the polymerization than the other unsaturated material, in a solvent that does not polymerize to enter into the polymer chain, the proportions of unsaturated materials being such that the solvent will not dissolve all of the amide but will dissolve all of the other unsaturated material so that when the polymerization begins some of the amide is present in the polymerization mix in undissolved form, said solvent comprising a mixture of water and an alcohol.

6. A process for the production of copolymers of improved homogeneity, which comprises polymerizing together in solution an $\alpha$-$\beta$ mono-ethylenically unsaturated acid amide and acrylonitrile, said amide being a solid at the temperature of polymerization and being more rapidly reacting in the polymerization than the acrylonitrile, in a solvent that does not polymerize to enter into the polymer chain the proportions of amide, acrylonitrile and solvent being such that the solvent will not dissolve all of the amide but will dissolve all of the acrylonitrile so that when the polymerization begins some of the amide is present in the polymerization mix in undissolved form.

7. A process for the production of copolymers of improved homogeneity, which comprises polymerizing together in solution an $\alpha$-$\beta$ mono-ethylenically unsaturated acid amide and acrylonitrile, said amide being a solid at the temperature of polymerization and being more rapidly reacting in the polymerization than the acrylonitrile, in a solvent that does not polymerize to enter into the polymer chain the proportions of amide, acrylonitrile and solvent being such that the solvent will not dissolve all of the amide but will dissolve all of the acrylonitrile so that when the polymerization begins some of the amide is present in the polymerization mix in undissolved form, said solvent comprising a mixture of water and an alcohol.

8. A process for the production of copolymers of improved homogeneity, which comprises polymerizing together in solution an $\alpha$-$\beta$ mono-ethylenically unsaturated acid amide and acrylonitrile, said amide being a solid at the temperature of polymerization and being more rapidly reacting in the polymerization than the acrylonitrile, in a solvent that does not polymerize to enter into the polymer chain the proportions of amide, acrylonitrile and solvent being such that the solvent will not dissolve all of the amide but will dissolve all of the acrylonitrile so that when the polymerization begins some of the amide is present in the polymerization mix in undissolved form, said solvent comprising a mixture of water and methanol.

References Cited in the file of this patent

UNITED STATES PATENTS

| | | |
|---|---|---|
| 2,456,360 | Arnold | Dec. 14, 1948 |
| 2,546,220 | Fryling | Mar. 27, 1951 |
| 2,560,680 | Allewelt | July 17, 1951 |
| 2,566,821 | Brown et al. | Sept. 4, 1951 |
| 2,567,109 | Howard | Sept. 4, 1951 |
| 2,587,465 | Ham et al. | Feb. 16, 1952 |